OR RE 11,553

DEVICE FOR CONTROLLING THE FLOW OF WATER FROM WATER PIPES OF HOUSES.

No. 11,553. Reissued June 30, 1896.

Witnesses
Ernest Hopkinson
Cortland Woodburn

Inventor
Wolcott A. Hull
by Edwin H. Brown
his attorney

UNITED STATES PATENT OFFICE.

WOLCOTT A. HULL, OF NEW YORK, N. Y.

DEVICE FOR CONTROLLING THE FLOW OF WATER FROM WATER-PIPES OF HOUSES.

SPECIFICATION forming part of Reissued Letters Patent No. 11,553, dated June 30, 1896.

Original No. 556,983, dated March 24, 1896. Application for reissue filed May 23, 1896. Serial No. 592,889.

*To all whom it may concern:*

Be it known that I, WOLCOTT A. HULL, of New York, in the county and State of New York, have invented a certain new and useful Improvement in Devices for Controlling the Flow of Water from the Waste-Pipes of Houses, of which the following is a specification.

My improvement relates particularly to devices for controlling the flow of water from the water-pipes of houses.

I will describe a device embodying my invention, and then set forth its novel features in the claims.

Figure 2:
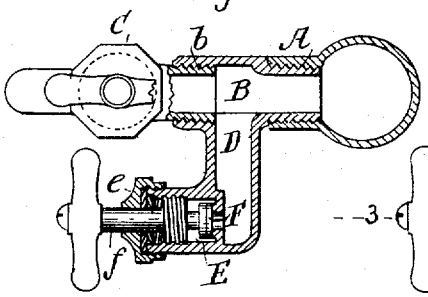
Figure 1:
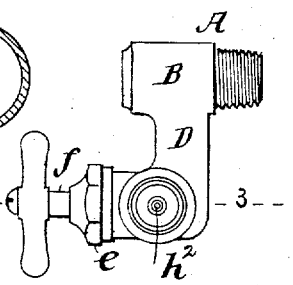
Figure 3:
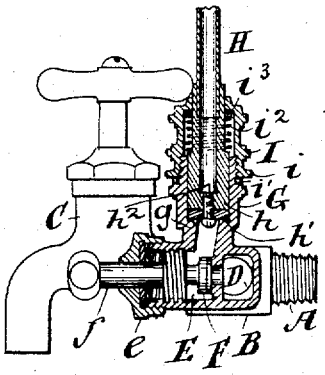

In the accompanying drawings, Figure 1 is a plan view of a device embodying my improvement. Fig. 2 is a central section of the same, taken in a plane parallel to that of Fig. 1. In this view other parts are also shown for the purpose of illustrating the invention. Fig. 3 is a sectional view at the plane of the dotted line 3 3, Fig. 1.

Similar letters of reference designate corresponding parts in all the figures.

I have illustrated my invention in the form of a coupling serving to unite a faucet of any suitable construction with a water-pipe. The device is in effect a part of a faucet, and the invention may be regarded as embodied in a faucet, especially as it comprises a means for controlling the flow of water through a waterway.

A designates an externally-screw-threaded nipple adapted to be screwed into a corresponding part comprised in a water-pipe. This nipple is connected with one end of a chamber B, which at the other end has an internally-screw-threaded portion *b* suitable for receiving an externally-screw-threaded faucet C, as indicated in Fig. 2.

From the chamber B extends a conduit D, which at the outer end is provided with a valve-chamber E, here shown as made in the form of a chamber for a compression-cock. Combined with the valve-seat of this chamber is a valve F, operated in the usual way by a stem *f* passing through a removable cap *e*.

It will be seen that the valve-chamber extends at right angles to the conduit D, and hence parallel with the chamber B. This is important, because it makes it possible to fasten the chamber B, by means of the nipple A, to a water-pipe, with the conduit D and valve-chamber E close to a wall, for, obviously, as the handle of the cock or valve extends forwardly it will not entail the necessity for providing any space between the valve-chamber and the wall.

From the top of the valve-chamber E extends a nipple G, and with this may be connected any suitable discharge pipe or nozzle. In the nipple G is fitted a swivel-pipe H, which is fastened into a swivel-piece *h*, the latter being fitted into the nipple G. The lower end of this swivel-piece is provided with a packing *h'*, which impinges against a seat *g*. A tubular screw $h^2$ secures the packing in place.

I designates a coupling-piece surrounding the swivel-pipe and swivel-piece and extending downwardly over the nipple G, it being secured to the latter by means of screw-threads. At the lower end it has a flange *i*, which impinges against a packing *i'*, resting upon a shoulder formed exteriorly on the nipple. Within the coupling is a spring $i^2$, surrounding the swivel-piece *h*, above a shoulder with which it is provided and having bearings on the upper side of said shoulder and the inner side of the top portion of the coupling. Packing $i^3$ may be interposed between the spring and the top portion of the coupling to prevent leakage.

It will be seen that by my improvement I provide in a simple manner for two waterways in communication with one pipe under control of two valves or cocks. One may be used for supplying water for washing purposes and the other for controlling the passage of water through a filter for drinking purposes.

It is advantageous to embody my invention in a coupling piece or device such as is illustrated in the drawings, because then it renders the use of an ordinary faucet possible, as illustrated in Fig. 2.

What I claim as my invention, and desire to secure by Letters Patent, is—

1. A coupling-piece for connecting a faucet with a water-pipe, and having a compression-cock communicating with the faucet, and having its stem and handle extended forwardly, and a nipple communicating with the compression-cock and extending upwardly, substantially as specified.

2. The combination with a water-outlet having an internally-cylindric socket, a pipe receiving water from said socket, and a swivel-piece made independently of, but secured to, the last-said pipe, and fitted in said socket, substantially as specified.

3. The combination with a faucet-body having two waterways constructed to be separately controlled, and an upwardly-extending socket with which one of the waterways communicates, of a pipe fitted to said socket, extending directly upward therefrom, oscillatory on its axis, having a passage for receiving water from that one of the waterways from which the said socket extends, a water-tight joint between said pipe and socket, and a spring for maintaining said joint intact, substantially as specified.

4. The combination with a faucet-body having two waterways constructed to be separately controlled, and an upwardly-extending socket with which one of the waterways communicates, of a pipe fitted to said socket, extending directly upward therefrom, oscillatory on its axis, having a passage through its end, and a packing for maintaining a tight joint between said socket and pipe, substantially as specified.

WOLCOTT A. HULL.

Witnesses:
S. ROBERTS,
WALTER A. PAULING.